UNITED STATES PATENT OFFICE.

OSCAR BALLY, OF MANNHEIM, GERMANY, ASSIGNOR TO BADISCHE ANILIN & SODA FABRIK, OF LUDWIGSHAFEN-ON-THE-RHINE, GERMANY, A CORPORATION OF BADEN.

COMPOUND OF THE ANTHRACENE SERIES AND PROCESS OF MAKING SAME.

No. 795,751.      Specification of Letters Patent.      Patented July 25, 1905.

Application filed April 22, 1905. Serial No. 256,987.

*To all whom it may concern:*

Be it known that I, OSCAR BALLY, doctor of philosophy and chemist, a citizen of the Swiss Republic, residing at Mannheim, in the Grand Duchy of Baden, in the German Empire, have invented new and useful Improvements in Compounds of the Anthracene Series and Processes of Making the Same, of which the following is a specification.

My invention consists in the obtainment of new compounds or derivatives of the anthracene series by condensing the reduction products of anthraquinone or its derivatives—such, for example, as anthranol—with an aldehyde, whether of the aromatic or the aliphatic series. The new compounds so obtained are of use in the preparation of coloring-matters.

The following examples will serve to further illustrate the nature of my invention, which, however, is not confined to these examples. The parts are by weight.

Example 1: Introduce ten (10) parts of anthranol into three hundred (300) parts of sulfuric acid containing about eighty-two (82) per cent. of $H_2SO_4$ and then add fifteen (15) parts of benzaldehyde. Allow the mixture to stand, say, for twenty-four (24) hours at a temperature of from thirty to thirty-five degrees centigrade (30° to 35° C.,) (it will in a short time have assumed a deep-red color,) and then pour the reaction mixture into water and extract with ether. Distil off the ether from the ethereal extract and distil the residue with steam in order to remove any unaltered benzaldehyde. An oily residue remains, which after a short time solidifies and can then be recrystallized out of alcohol. In this manner light-yellow crystalline needles are obtained, these melting at a temperature of from one hundred and twelve to one hundred and fourteen degrees centigrade, (112° to 114° C.) Dilute acids and dilute alkalies have no action upon this compound, which, however, is soluble in concentrated sulfuric acid, yielding a fuchsin-red solution. In this example oxanthranol can be employed instead of anthranol, a similar product being obtained.

Example 2: Introduce ten (10) parts of anthranol into three thousand (3,000) parts of sulfuric acid containing eighty-two (82) per cent. of $H_2SO_4$ and add ten (10) parts of paraaldehyde. In a short time the mixture assumes a reddish-brown color. Allow the mixture to stand for twenty-four (24) hours at a temperature of from thirty to forty-five degrees centigrade (30° to 45° C.) and then pour the reaction mixture into water, whereupon the condensation product is precipitated as brown flakes. Filter off this condensation product and wash and dry it while warming gently. The unpurified product is a yellow-olive powder which is not reacted upon by dilute acids and dilute alkalies. It is easily soluble in most organic solvents, and it is also soluble in concentrated sulfuric acid, the solution being fluorescent and reddish brown.

In a similar manner other aldehydes and substituted aldehydes, either of the aromatic or the aliphatic series, can be condensed with anthranol and with other reduction products of anthraquinone and its derivatives.

Now what I claim is—

1. The production of new compounds of the anthracene series by condensing a reduction product of an anthraquinone body with an aldehyde in the presence of sulfuric acid.

2. The production of new compounds of the anthracene series by condensing anthranol with an aldehyde in the presence of sulfuric acid.

3. The production of a new compound of the anthracene series by condensing anthranol with benzaldehyde in the presence of sulfuric acid.

4. As new articles of manufacture the compounds which can be obtained from a reduction product of an anthraquinone body and an aldehyde, which compounds are insoluble in dilute acids and in dilute alkalies, but are soluble in concentrated sulfuric acid yielding from red to reddish-brown solutions and which are generally soluble in organic solvents.

5. As a new article of manufacture the compound which can be obtained from anthranol and benzaldehyde, which compound consists of yellow crystalline needles which melt at a temperature of about 114° centigrade, and which are insoluble in dilute acids and in dilute alkalies, but are soluble in concentrated sulfuric acid yielding a fuchsin-red solution.

In testimony whereof I have hereunto set my hand in the presence of two subscribing witnesses.

OSCAR BALLY.

Witnesses:
    ERNEST F. EHRHARDT,
    J. ALEC. LLOYD.